JOHN BURNHAM.
Water Tanks for Railroads.
No. 4,774. Reissued March 5, 1872.
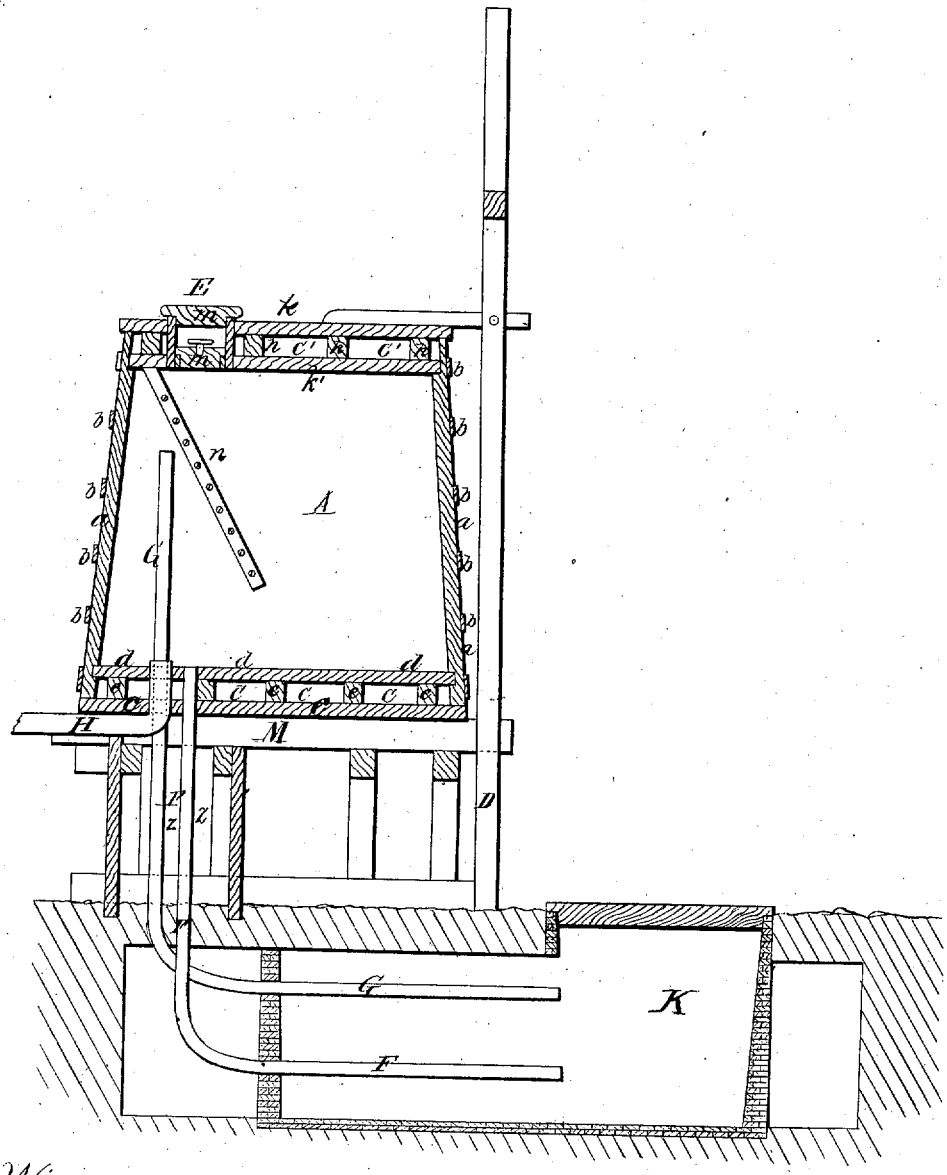
Witnesses
Villette Anderson
F. B. Curtis
Inventor.
John Burnham
Chapman Cosmus & Co
Attys
THE NORRIS PETERS CO., WASHINGTON, D. C.

UNITED STATES PATENT OFFICE.

JOHN BURNHAM, OF BATAVIA, ILLINOIS.

IMPROVEMENT IN WATER-TANKS FOR RAILROADS.

Specification forming part of Letters Patent No. 93,052, dated July 27, 1869; reissue No. 4,774, dated March 5, 1872.

Be it known that I, JOHN BURNHAM, of Batavia, in the county of Kane and State of Illinois, have invented certain new and valuable Improvements in "Water-Tanks for Railway Stations;" and I do hereby declare that the following is a full, clear, and exact description of the construction and operation of the same, reference being had to the annexed drawing making a part of this specification.

My invention has relation to out-door tanks and apparatus at railway stations, designed for supplying water to locomotives; and it consists in the novel arrangement and application of devices, intended to serve as efficient means for preventing the freezing of the water in such tanks and their connections, whereby they are rendered capable of use in the coldest season or climate, without the necessity of building houses over them for their protection, or the employment of stoves, fuel, and attendance—practices which now obtain in much the largest portion of this country, annually subjecting railway companies to great expense, to be borne afterward by the traveling community.

In the accompanying drawing, the letter A designates my water-tank, raised upon a frame, D M, or other support, of sufficient altitude to bring the bottom of the tank above the boiler of the locomotive to enable the water to pass by its own gravity from the tank to such boiler. It is usually constructed in a circular form, of staves *a*, and surrounded with hoops *b*. But any other form may be adopted which is thought to be desirable. The beams M are covered with match-boards *c*, which form the flooring upon which the tank rests, its outer wall extending downward and fitting closely to the match-boards. *d* represents the bottom of the tank. On account of the usually great size of such a tank, its bottom is generally required to be supported by the cross-beams *e*, which lie, as shown in the drawing, between the floor *c* and the bottom *d* of the tank. C represents the chamber, formed between the floor *c* and the bottom *d*. This chamber is designed to serve as a receptacle for imprisoned air or other non-conducting material. *k* represents the top or roof of the tank, supported by the transverse beams *h* laid across the tank-wall. To the under sides of the beams *h* are secured the match-boards *k'*, forming a ceiling to the tank, the space between the roof *k* and ceiling *k'* forming a chamber, C', designed as a receptacle for air or other non-conducting substance. I may construct similar chambers extending around the sides of the tank, but for all ordinary use the non-conducting top and bottom are sufficient for the purpose contemplated. In a tolerably mild climate the non-conducting top alone will serve to prevent congelation; and if the station be conveniently situated for the employment of spring or well water, the climate being mild as aforesaid, the top may be formed of thick heavy timber, well fitted together, so as to exclude the external air, and the ceiling *k'* dispensed with. When this method of construction is adopted, the top of the waste-pipe G is arranged at such a height that a considerable air-space shall always exist between the surface of the water in the tank and the roof *k*. The man-hole E in the top should be provided with double covers *m m*, an air-space being formed between the two, as illustrated in the drawing. The letter F represents the pipe, by means of which water is supplied to the tank; and G, the escape-pipe, which conducts the water off. H represents the conduit, through which the water is passed from the tank to the locomotive. The letters *n n* represent ladders, arranged respectively in the tank and pump-pit K. The pump-pit should be sunk in the ground, as illustrated. The space between the bottom of the tank and the surface of the ground, immediately around the supply-pipe, is inclosed in a chamber, *z*, and if necessary this chamber is designed to be filled with suitable non-conducting packing, to prevent this pipe from becoming inoperative by the freezing of the water therein. I also, when it is desirable, pack the chambers C C' with such substance as will aid in preventing the escape of heat from the interior of the tank, as this is the sole object of said chambers.

I do not claim broadly the invention of air-chambers, for I am aware that they have been used in refrigerators; but

What I claim as my invention, and desire to secure by Letters Patent, is—

1. In a water-tank for railway stations the non-conducting top, substantially as specified.

2. The water-tank for railway stations herein described, having a non-conducting top, chamber *z*, pipes G, F, and H, and pit K, constructed and arranged substantially as specified.

In testimony that I claim the above I have hereunto subscribed my name in the presence of two witnesses.

JOHN BURNHAM.

Witnesses:
F. B. CURTIS,
JNO. M. HYNE.